United States Patent [19]
Simon et al.

[11] Patent Number: 5,418,380
[45] Date of Patent: May 23, 1995

[54] OPTICAL CORRELATOR USING FERROELECTRIC LIQUID CRYSTAL SPATIAL LIGHT MODULATORS AND FOURIER TRANSFORM LENSES

[75] Inventors: Darren M. Simon, Denver; Steven A. Serati, Golden, both of Colo.

[73] Assignee: Martin Marietta Corporation, Bethesda, Md.

[21] Appl. No.: 226,461

[22] Filed: Apr. 12, 1994

[51] Int. Cl.⁶ .................................. G02B 27/42
[52] U.S. Cl. ................................ 250/550; 359/561
[58] Field of Search .................. 250/550, 561, 239; 359/559–561; 382/31, 42, 32, 8; 364/822

[56] References Cited

U.S. PATENT DOCUMENTS

| | | |
|---|---|---|
| 4,357,676 | 11/1982 | Brown ............................... 359/561 |
| 4,695,973 | 9/1987 | Yu . |
| 4,815,035 | 3/1989 | Brooks . |
| 4,832,447 | 5/1989 | Javidi . |
| 4,941,735 | 7/1990 | Moddel et al. . |
| 5,029,220 | 7/1991 | Juday . |
| 5,050,220 | 9/1991 | Marsh et al. . |
| 5,073,010 | 12/1991 | Johnson et al. . |
| 5,086,483 | 2/1992 | Capps . |
| 5,150,228 | 9/1992 | Liu et al. . |
| 5,150,229 | 9/1992 | Takesue et al. . |
| 5,177,628 | 1/1993 | Moddel . |
| 5,178,445 | 1/1993 | Moddel et al. . |
| 5,221,989 | 6/1993 | Stappaerts et al. . |
| 5,363,455 | 11/1994 | Nishii et al. ....................... 359/561 |

*Primary Examiner*—David C. Nelms
*Assistant Examiner*—Que T. Le
*Attorney, Agent, or Firm*—Dorr, Carson, Sloan & Birney

[57] ABSTRACT

An optical correlator uses ferroelectric liquid crystal spatial light modulators (FLC-SLM's) in both the reference and filter planes. The SLM's include an electrically addressable memory to store images in the form a two-dimensional array of reflective pixels beneath the FLC layer. The SLM's selectively rotate the polarization of the light reflected by each pixel in accordance with the stored image. In particular, a laser produces a polarized beam that is directed through a first polarizing beamsplitter and onto the reference SLM. This beamsplitter blocks unmodulated light reflected by the reference SLM and transmits modulated light through a set of Fourier tranform lenses. The resulting beam is directed through a second polarizing beam splitter onto a filter SLM that has been programmed with the complex conjugate of the Fourier transform of a desired target image. Unmodulated light reflected from the filter SLM is blocked by the second polarizing beamsplitter and modulated light is reflected by the second polarizing beamsplitter through a set of inverse Fourier transform lenses. A CCD camera detects any correlation peak produced by the inverse Fourier transform lenses. A computer system downloads images to the SLM's and analyzes the correlation peaks detected by the camera. A half-wave plate can be included between both sets of SLM's and polarizing beamsplitters to allow manual adjustment of the polarization of the incident beam entering the SLM.

17 Claims, 3 Drawing Sheets

OPTICAL CORRELATOR USING FERROELECTRIC LIQUID CRYSTAL SPATIAL LIGHT MODULATORS AND FOURIER TRANSFORM LENSES

BACKGROUND OF THE INVENTION

1. Field of the Invention

The present invention relates generally to the field of optical correlators. More specifically, the present invention discloses an optical correlator using ferroelectric liquid crystal spatial light modulators.

2. Statement of the Problem

Optical correlators were first suggested shortly after the advent of the laser in the early 1960's by A. Vander Lugt et al. at the University of Michigan. In early optical correlators, the input scene was introduced into the correlator by means of a photographic film transparency. The spatial filter was provided by means of a holographic film created by generating a hologram of the filter image's Fourier transform. Special care had to be taken to: (1) generate an acceptable spatial filter because of the generally large dynamic range of the Fourier transform; and (2) align the input scene's spectrum and filter encoded on the hologram. This special care translated into many hours of filter preparation and tedious mechanical alignment. However, once correlation was achieved, the classical Vander Lugt correlator did a good job of recognizing and locating patterns.

One major shortcoming of such simple matched spatial filtering is that the filter is extremely sensitive to differences between the object in the input scene and the object from which the filter is generated. If the difference is more than a few degrees of in-plane rotation or a few percent in scale, the focused points of light in the correlator quickly defocus and the intensity of the signal diminishes. Thus, a robust pattern recognition system for a dynamic application required a large number of filters for each input to cover the different potential orientations and scales of the target. This problem was magnified prior to the mid-1980's by the fact that the process of changing the filter meant replacing the piece of holographic film to within a few wavelengths of light. Thus, until recently, optical correlation was viewed as good physics, but was not practical for most pattern recognition applications in the field.

A key enabling technological development in recent years is the spatial light modulator, or SLM. SLM's can be thought of as programmable transparencies or pieces of film. The use of SLM's, instead of film, in an optical correlator allows the system to rapidly change the input scene and the spatial filter without mechanically moving or replacing pads, thus accommodating the multiple-filter requirement necessary for practical pattern recognition system. SLM's have different programming speeds and resolutions depending on the type of material and the technique used to encode the scene information on the SLM. The two types of SLM's that appear best suited for use in two-dimensional pattern recognition systems are the magneto-optic SLM (MOSLM) and the family of liquid crystal SLM's.

MOSLM devices are commercially available in pixel densities of up to 256×256 and have been demonstrated to operate at over 2000 Hz in short bursts, with more practical operating frame rates of 500 Hz for a 128×128 device and 100 Hz for a 256×256 device. The modulating principle of the MOSLM is Faraday rotation of the polarization vector of the incident light as the light transmits through the MOSLM. The pixels are independently and electronically addressed and are capable of binary amplitude, binary phase, or ternary phase-amplitude (combination of binary amplitude and binary phase) modulation.

Liquid crystal technology has long been used for incoherent imaging in such applications as digital clocks, watches, and television displays. The majority of these devices use a nematic liquid crystal material that provides analog modulation, but is limited in switching speed. The most prominent nematic liquid crystal SLM for coherent imaging is the liquid crystal light valve, or LCLV. Unlike an MOSLM, an LCLV is optically addressed, rather than electrically addressed. This requires the LCLV to be programmed by another light source such as the illumination from a mini-CRT display. An LCLV uses the birefringence property of the crystalline structure and a controlled design thickness to achieve its modulation capability. The device has a maximum resolution of approximately 30 line pairs per millimeter, which equates to pixel densities on the order of 750×750. It has a maximum operating speed of approximately 25 to 30 Hz with the ability for modulating approximately 10 to 15 linear gray levels.

A second type of liquid crystal SLM that has recently made significant advances in performance capabilities is the ferroelectric liquid crystal (FLC) used in the present invention. The basic performance differences between FLC SLM's and LCLV SLM's are their addressing capabilities and frame rates. FLC's can be either optically or electrically addressed, whereas LCLV's are only optically addressed. In addition, LCLV's operate at only approximately 30 Hz. Optically addressed FLC's have been operated at over 4500 Hz, and electrically addressed FLC's have been operated at approximately 10,000 Hz. The modulation principle of the FLC SLM is similar to the MOSLM in its operation (i.e., rotation of the modulator's optic axis), but the rotation is due to a reorientation of the liquid crystal molecules under an applied electric field instead of a Faraday effect. The FLC SLM is optically more efficient than the MOSLM since its axis rotation is ±22 degrees versus a few degrees for the MOSLM.

A number of optical correlators and SLM's have been patented in the past, including the following:

| Inventor | U.S. Pat. No. | Issue Date |
| --- | --- | --- |
| Yu | 4,695,973 | Sept. 22, 1987 |
| Brooks | 4,815,035 | Mar. 21, 1989 |
| Javidi | 4,832,447 | May 23, 1989 |
| Moddel et al. | 4,941,735 | July 17, 1990 |
| Juday | 5,029,220 | July 2, 1991 |
| Marsh et al. | 5,050,220 | Sept. 17, 1991 |
| Johnson et al. | 5,073,010 | Dec. 17, 1991 |
| Capps | 5,086,483 | Feb. 4, 1992 |
| Liu et al. | 5,150,228 | Sept. 22, 1992 |
| Takesue et al. | 5,150,229 | Sept. 22, 1992 |
| Moddel | 5,177,628 | Jan. 5, 1993 |
| Moddel et al. | 5,178,445 | Jan. 12, 1993 |
| Stappaerts et al. | 5,221,989 | June 22, 1993 |

Yu discloses a real-time programmable optical correlator that incorporates a magneto-optic spatial light modulator (MOSLM) and a liquid crystal light valve (LCLV).

Javidi discloses an optical correlator that employs a spatial modulator operating in a binary mode at the Fourier plane. The reference and input images are illuminated by a coherent light at the object plane of a Fourier transform lens system. An image detection device, such as a charge couple device (CCD) is placed at the Fourier plane of this Fourier transform lens system to detect the intensity of images. A thresholding network generates a binary output for each pixel of the Fourier transform interference intensity indicating whether the image intensity for that pixel is greater than the median intensity.

Juday discloses an optical correlator for real-time tracking of the position of the retina during laser eye surgery.

Capps discloses a hybrid optical/electronic processor in the general configuration of a Vander Lugt optical correlator with an input SLM 12, a first Fourier transform lens 16, a target SLM 14, a second Fourier transform lens 18, and an electronic processing array 20. The processing array 20 consists of a two-dimensional array of cells 40, each of which is connected to its nearest neighbors to facilitate peak detection.

Takesue et al. disclose an optical correlator that generates pictorial patterns of a sum of two patterns of pictorial information to be compared and of a difference between the two patterns by a phase conjugate wave form. The system then transforms the pictorial patterns into first Fourier transform images, generates a pictorial pattern of a difference between an intensity distribution of the first Fourier transform images by the phase conjugate wave form, and transforms the pictorial pattern of a difference between an intensity distribution of the first Fourier transform images into second Fourier transform images. The optical correlator detects a cross-correlation peak of the two patterns of pictorial information for comparison at a high signal-to-noise ratio.

Liu et al. disclose another example of an optical correlator using liquid crystal TV's (LCTV1 and LCTV2) to change the input and reference images in real time.

Marsh et al. disclose an optical correlator for fingerprint identification. Two spatial light modulators 28 and 32 are employed to input the unknown fingerprint and a sequence of reference fingerprints for comparison.

The patents to Johnson et al., Moddel, and Moddel et al. disclose several types of optically addressable spatial light modulators incorporating ferroelectric liquid crystals.

Brooks discloses an example of a scrolling spatial light modulator using an array of ferroelectric liquid crystal cells.

Stappaerts et al. disclose an example of a spatial light modulator using non-ferroelectric PLZT ceramic.

3. Solution to the Problem

None of the prior art references uncovered in the search show an optical correlator using electrically addressable FLC spatial light modulators in the present optical configuration. The optical design is compact and facilitates easier system alignment. The system offers real-time pattern recognition at high image rates and at high resolution.

SUMMARY OF THE INVENTION

This invention provides an optical correlator using ferroelectric liquid crystal spatial light modulators (FLC-SLM's) in both the reference and filter planes. The SLM's include an electrically addressable memory to store images in the form of a two-dimensional array of reflective pixels beneath the FLC layer. The SLM's selectively rotate the polarization of the light reflected by each pixel in accordance with the stored image. In particular, a laser produces a polarized beam that is directed through a first polarizing beamsplitter and onto the reference SLM. This beamsplitter blocks unmodulated light reflected by the reference SLM and transmits modulated light through a set of Fourier tranform lenses. The resulting beam is directed through a second polarizing beam splitter and onto a filter SLM that has been programmed with the complex conjugate of the Fourier transform of a desired target image. Unmodulated light reflected from the filter SLM is blocked by the second polarizing beamsplitter and modulated light is reflected by the second polarizing beamsplitter through a set of inverse Fourier transform lenses. A CCD camera detects any correlation peak produced by the inverse Fourier transform lenses. A computer system downloads images to the SLM's and analyzes the correlation peaks detected by the camera. A half-wave plate can be included between both sets of SLM's and polarizing beamsplitters to allow manual adjustment of the polarization of the incident beam entering the SLM.

A primary object of the present invention is to provide an optical correlator capable of performing automated pattern recognition at high speeds.

Another object of the present invention is to provide an optical correlator that is compact and portable.

Yet another object of the present invention is to provide an optical correlator that is easy to initially align and maintains its alignment.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
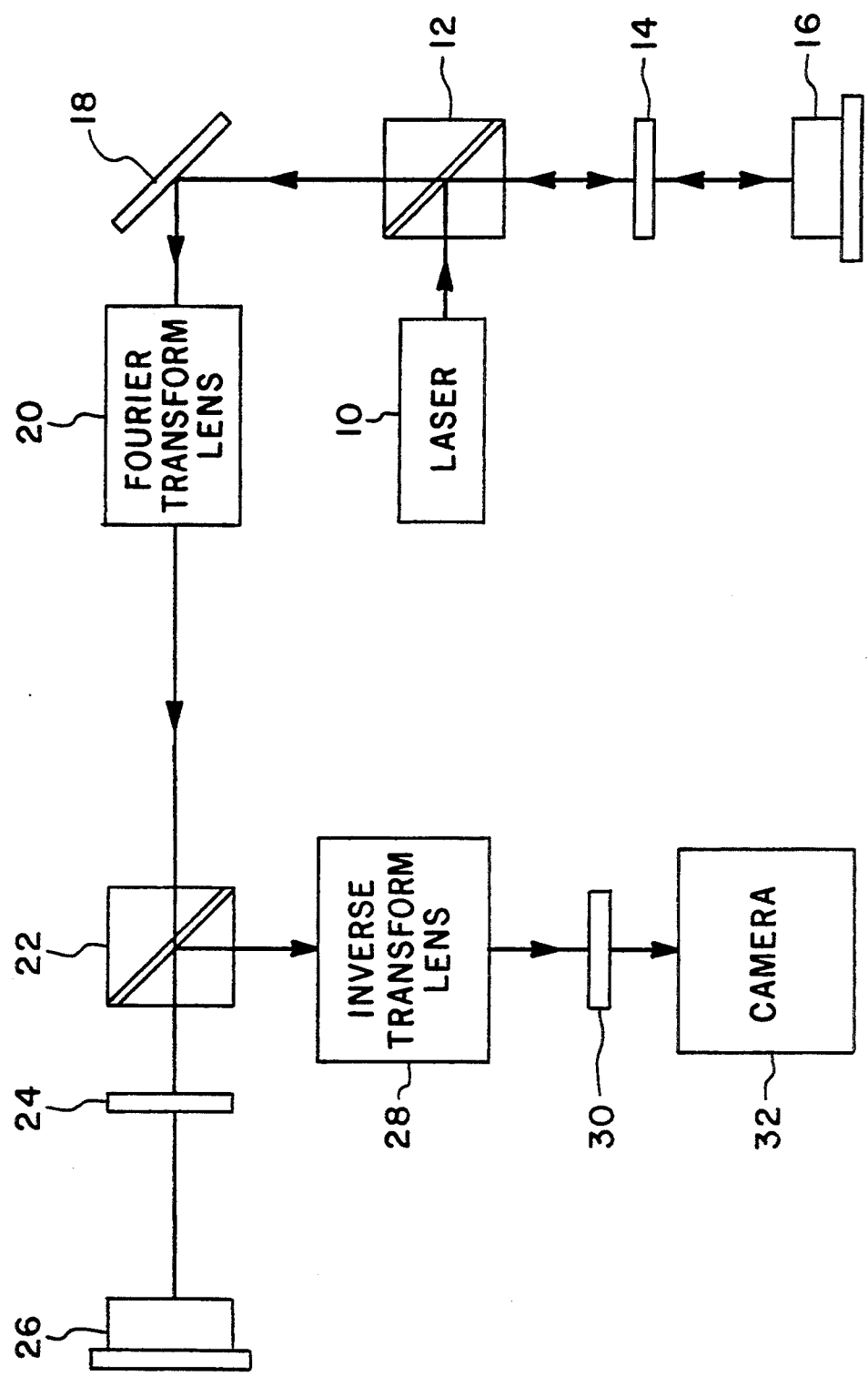
FIG. 1 is a simplified block diagram of the optical correlator.

Turning to FIG. 1, a block diagram is provided of the overall optical configuration of the present optical correlator. In short, the present invention is a fully programmable Vander Lugt correlator. Two electrically addressable ferroelectric liquid crystal (FLC) spatial light modulators (SLM's) 16 and 26 are located at the focal planes of the Fourier transform lenses 20. The reference SLM 16 is used to input image data. The filter SLM 26 is used to spatially filter the input data for a desired target image. The image data from the reference SLM 16 is transformed by the Fourier transform lenses 20 into its spatial frequencies. The filter SLM 26 multiplies the spectral components of the image data with a pattern that extracts the desired image from the input data. The filter is designed such that its frequency response is the complex conjugate of the desired target image (i.e., the filter is the complex conjugate of the Fourier transform of the desired image). The filter is generated and implemented as a binary phase-only filter (BPOF). The modulated light from the filter SLM 26 is inverse transformed by an inverse Fourier transform lens 28, resulting in the convolution of the image data with the filter pattern. An image pattern that matches the filter will produce a collimated wavefront that is focused to a bright spot in the correlation plane where the camera 32 is located. The positions of any bright spots will coincide with the locations of the matching patterns in the input image. Phase distortion (i.e., spreading of the correlation peak) is minimized since both the filter SLM 26 and the correlation plane are at the focal planes of the inverse transform lens 28. Hence, all of the correlator's processing elements are at the focal planes of the two transform lenses 20 and 28. This general configuration is sometimes referred to as a "4f correlator."

Spatial Light Modulator

Figure 2:
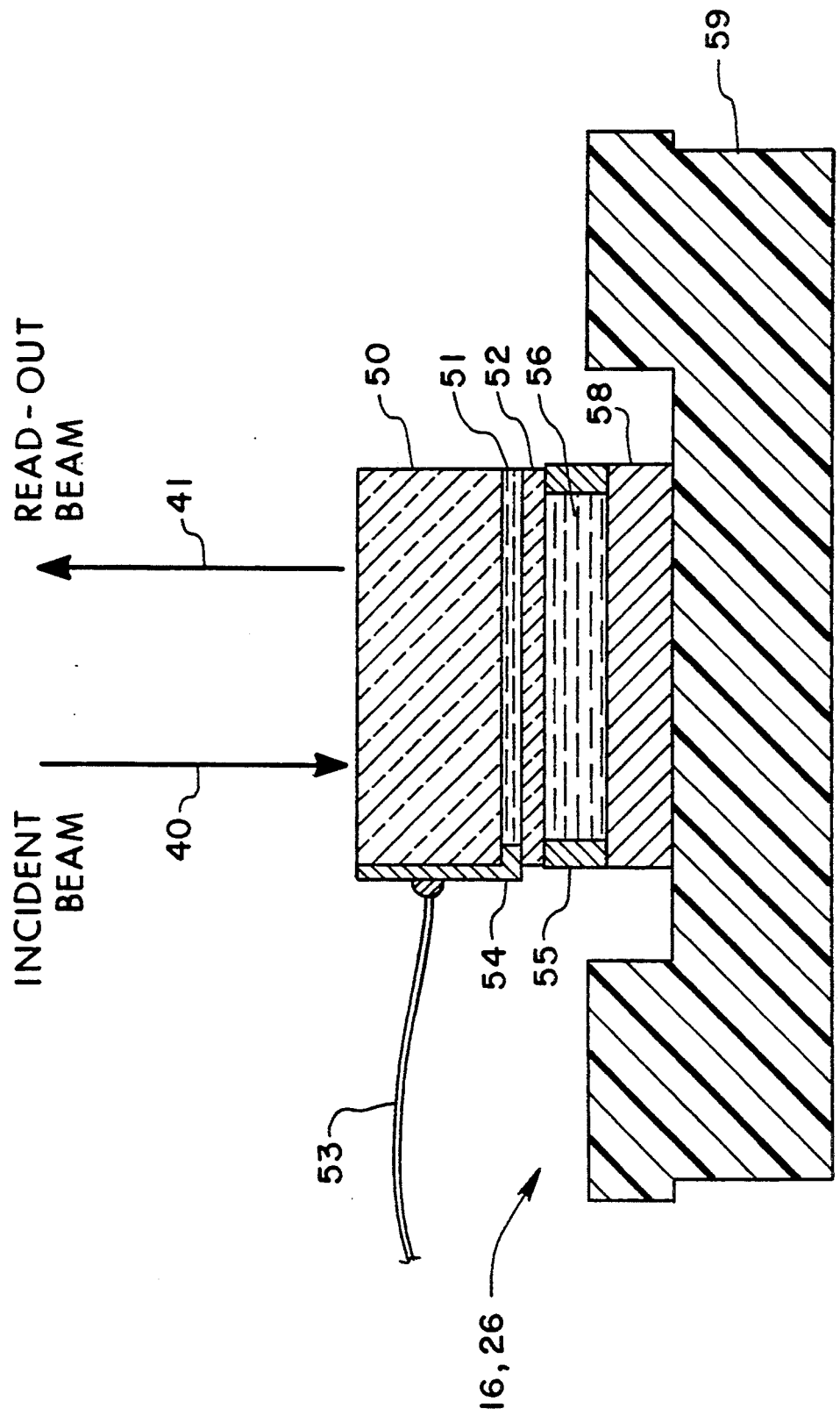
FIG. 2 is a cross-sectional view of an electronically addressable ferroelectric liquid crystal spatial light modulator.

FIG. 2 provides a cross-sectional view of the ferroelectric liquid crystal SLM 16, 26. This device uses a dynamic memory on a very large scale integration (VLSI) backplane to activate a liquid crystal modulator. A transparent and conductive indium oxide (ITO) layer 51 is deposited on the undersurface of the cover glass 50. This surface is then coated with an alignment layer 52. A preferred alignment material is polybutylene teraphthalate (PBT). Other alignment materials, such as polyvinyl alcohol, silicon monoxide (SiO), silicon dioxide ($SiO_2$), and Langmuir-Blodgett films are also suitable. A metallic electrode 54 with an electrode wire 53 is mechanically bonded to the cover glass 50. This metallic electrode 54 is also electrically connected to the ITO layer 51 to produce a transparent top electrode. A smectic C* ferroelectric liquid crystal (FLC) layer 56 is placed within a SiO spacer 55 between the top electrode and the VLSI chip 58. The VLSI chip is bonded to a PGA socket that provides external electrical connections and mechanical stability.

Figure 3:
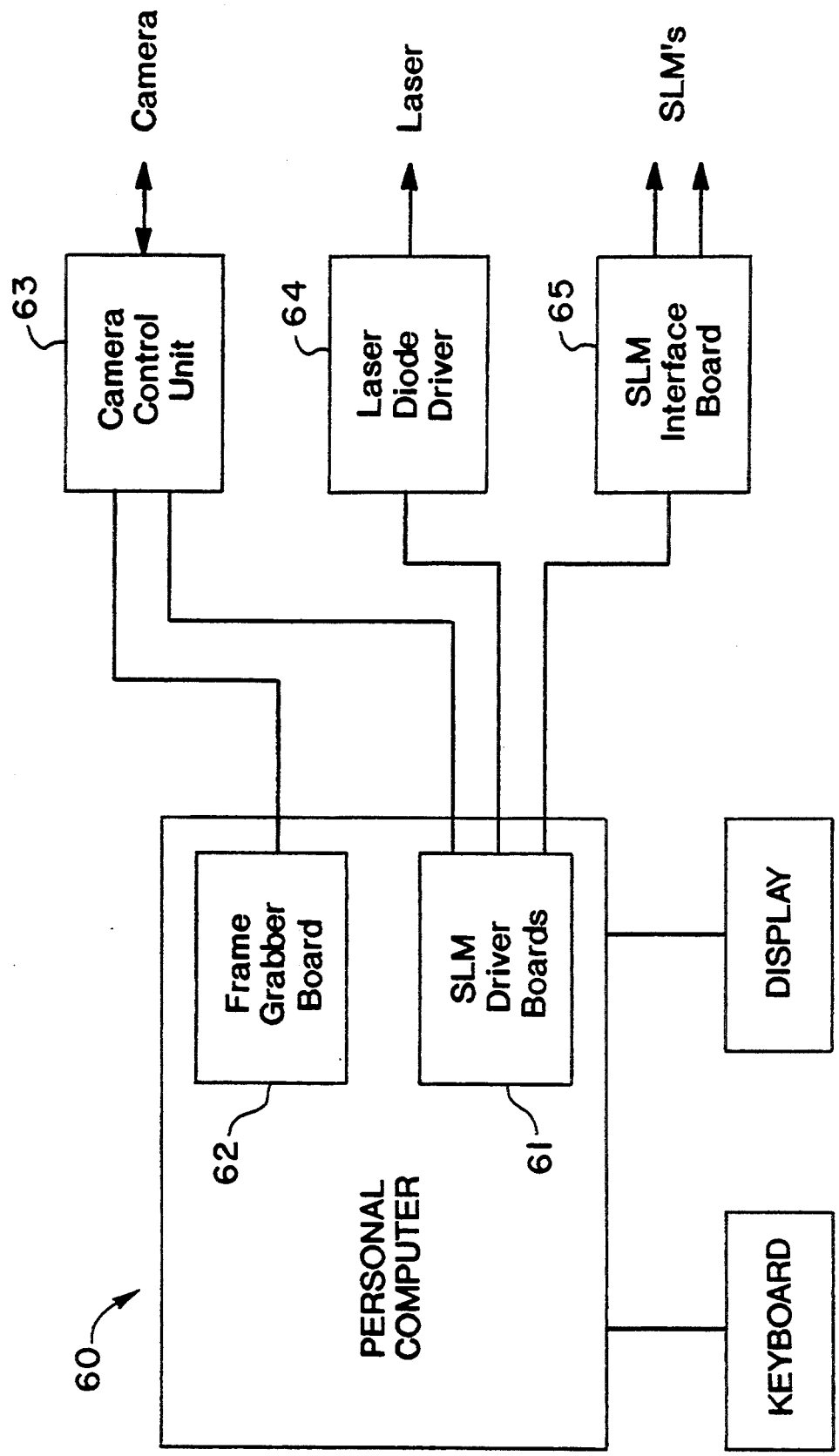
FIG. 3 is simplified block diagram of the computer system used to interface with and control the optical correlator.

The VLSI backplane consists of a two-dimensional array of conductive pads, each of which form one pixel. These conductive pads act as electrodes to apply voltage across the FLC layer. The conductive pads also serve as mirrors that output the SLM's signal by reflection, since the VLSI backplane is non-transmissive. Each pad is electrically connected to an independent dynamic memory cell within the VLSI chip. Each memory cell stores a binary bit of data (i.e., 1 or 0). Binary data is sequentially loaded by rows into the dynamic memory cells by means of an external computer and interface board, as shown in FIG. 3. A load cycle consists of writing data to each row comprising one image frame. A load cycle either writes new binary image data to the SLM or refreshes the old image data. SLM's incorporating this design have been produced by Boulder Nonlinear Systems, Inc., of Boulder, Colo., providing either 128×128 pads or 256×256 pads.

The 1's and 0's stored in each memory cell actually represent a voltage (i.e., +5 V or 0 V, respectively). These voltages are applied to the conductive pixel pad to produce an electric field between the pad and the transparent top electrode. By applying 2.5 volts to the top electrode, the electric field vectors at each pixel have equal magnitude, but the electric field vectors change direction depending on whether the data bit is a 1 or 0. The direction of the electric field vectors switches the FLC into one of two states by interacting with the polarized FLC molecule to produce either right or left handed torque on the molecule. A FLC molecule is free to rotate through small angles and will pivot about the smectic layer normal orientation ($\alpha_0$) until the torque, viscous, and elastic forces are equalized. This molecular rotation results in a bulk reorientation (or tilt) of the liquid crystal's optical axis. A nonlinear FLC material acts as a half-wave retarder. A half-wave retarder rotates the light's polarization by $2\phi$, where $\phi$ is the angle between the light's polarization and the waveplate's optic axis. Here, the polarization of the incident beam 40 is rotated by twice the tilt angle ($\Psi$) of the optic axis. For example, if the FLC's optic axis tilts ±22 degrees about the smectic layer normal orientation, the net change of 44 degrees in the optic axis will rotate the light's polarization by 88 degrees.

Rotation of the FLC material's optic axis (which is controlled by the direction of the electric field) produces a change in the light's polarization. This change in polarization can be converted to amplitude or phase modulation depending on the orientation of the FLC layer with respect to the polarization of the incident beam 40. Binary amplitude modulation occurs when the input light enters the SLM polarized along the optic axis orientation of one of the FLC's switched states and is reflected back through an output analyzer that is cross polarized to the input light. When the incident beam's polarization is aligned with the optic axis director, the reflected beam's polarization remains unchanged since the angle between the light's polarization and the optic axis director is zero. The reflected beam 41 remains cross polarized to the output analyzer and is blocked (Off state). When the input beam's polarization is not aligned with the optic axis director, the light's polarization is rotated by $2\phi$, where $\phi=2\Psi$. A portion of this light is transmitted by the output analyzer, producing an On state.

Binary phase or bipolar modulation occurs when the input light enters the device polarized along the smectic layer normal orientation. Again the reflected light 41 is analyzed by a crossed polarizer. In the bipolar case, the switched states rotate the light's polarization by $\pm 2\phi$ about the out analyzer's axis, where $\phi=\Psi$. Light transmitted by the output analyzer has equal amplitude but varies in phase by 180 degrees.

Both phase and amplitude modulation have certain characteristics that are useful in optical correlators. Amplitude modulation is very useful for verifying SLM operation and troubleshooting the correlator system since the image is visible. Phase modulation, on the other hand, provides better performance because it reduces various noise sources without decreasing signal power. The optical design for the correlator described herein allows use of either phase or amplitude modulation with only minor adjustments.

Optical Configuration

Returning to FIG. 1, the present invention uses polarization to modulate and direct light through the correlator. A laser diode source 10 produces a beam of coherent light that is polarized in a predetermined plane (i.e., S polarized). A first polarizing beamsplitter 12 intercepts this beam and reflects it through a half-wave plate 14 onto the reference SLM 16. The half-wave plate 14 rotates the polarization of the beam, so that the input light's polarization is aligned with the FLC's smectic layer normal for the reference SLM 16. When the input light's polarization is so aligned, the SLM serves as a bipolar or phase modulator. Alignment of the FLC layer for bipolar modulation for both the reference SLM 16 and the filter SLM 26 results in the best performance, since this type of alignment decreases the DC component, narrows the correlation peak, and reduces background noise. When an electric field is applied to the FLC material, the liquid crystal molecules are aligned with the electric field by dipole coupling. The molecule alignment has two orientations corresponding to the polarity of the applied electric field. Therefore, the FLC material acts as an active half-wave plate having a switchable optic axis. The optic axis of the FLC waveplate is symmetrically switched about its smectic layer normal by changing the polarity of the electric field across the FLC material. By switching the optic axis, the SLM rotates the polarization of the light reflected from its surface by approximately 90 degrees. The rotation occurs on a pixel by pixel basis depending on the electric field associated with any given pixel. Thus, light reflected by the SLM will be a pixel-by-pixel combination of orthogonally polarized rays corresponding to the pattern of 1's and 0's in the image stored in the SLM. In other words, the "1" pixels rotate the polarization of the incident beam by approximately 90 degrees with respect to the "0" pixels.

This rotation is used in combination with the polarizing beam splitter 12 in the present invention for binary modulation of the reflected light from the SLM. The present system employs two conventional polarized beamsplitters 12 and 22 in a combination with the reference SLM 16 and the filter SLM 26, respectively. Both are designed to reflect light that has been polarized in a predetermined plane and to transmit light polarized in a second orthogonal plane. The SLM's require that the incident beam 40 (see FIG. 2) must be normal to the backplane of the device and are very sensitive to any misalignment in this regard. The read-out beam 41 is also reflected along the same path normal to the backplane. The polarized beamsplitter allows the incident beam 40 and the reflected beam 41 to follow the same optical path to and from the SLM, and uses the change in polarization to separate the reflected beam 41 from the incident beam 40.

The light reflected by the reference SLM 16 passes back through the half-wave plate 14, which rotates its polarization to realign the polarization of the modulated light reflected from the reference SLM 16 with the polarizing beamsplitter 12. As previously discussed, only P-polarized light is transmitted by the polarized beamsplitter 12, and any S-polarized light is blocked. Therefore, only the modulated light that represents the input image stored in the reference SLM 16 reaches the Fourier transform lenses 20 and the filter SLM 26. This P-polarized beam is reflected by a mirror 18 and enters the Fourier transform lenses 20 where the beam is transformed into its spatial frequencies. The resulting beam passes through a second polarizing beamsplitter 22 that transmits only P-polarized light, and then passes through a second half-wave plate 24 that aligns the polarization of the beam with the FLC smectic layer normal.

The polarization of the light reaching the filter SLM 26 is again rotated on a pixel by pixel basis by the FLC layer, which has been programmed with the complex conjugate of the Fourier transform of desired image. The light that is modulated by the filter SLM 26 is orthogonally polarized to the incident beam, while unmodulated light is reflected with its field vector parallel to the incident beam. The reflected light passes back through the second half-wave plate 24, which rotates its polarization so that the modulated light from the filter SLM 26 becomes S-polarized. This S-polarized light reenters the second polarized beam splitter 22 and is reflected through the inverse transform lenses 28. This light signal passes through a polarizer 30 and is focused onto a CCD camera 32, which detects the correlation peak. The polarizer 30 in front of the camera 32 is used to increase the extinction ratio of the correlation-detection leg since broadband polarized beamsplitters 12, 22 have low extinction ratios when used in reflection.

The half-wave plates 14 and 24 are included in the present system largely to provide a means to manually adjust the polarization of the light entering the SLM's to precisely match the alignment axis of the FLC layer. It should be expressly understood that these components could be omitted, provided the remainder of the correlator is configured so that light exiting the polarizing beamsplitters 12 and 22 is precisely polarized to match the alignment axis of the FLC layer in their respective SLM's.

In the preferred embodiment of the present invention, the following components were used:

| | |
|---|---|
| Fourier transform lenses 20 | Melles Griot #01 LAO 239 |
| Inverse transform lenses 28 | Melles Griot #01 LAO 167 |
| Half-wave plates 14, 24 | Meadowlark #NRH-1.0-0670 |
| Polarizing beamsplitters 12, 22 | Meadowlark #BB2-1.0-Type II |
| Mirror 18 | Newport #10D20ER.2 |
| Laser Diode 10 | Melles Griot #56 DLL 645 |
| Polarizer 30 | Meadowlark #DP-0.5-HN42 |
| CCD camera 32 | Sony XC-77RR |

Correlator Electronics and Interface

FIG. 3 is a block diagram showing the complete system used to control and interface with the optical correlator from FIG. 1. The personal computer 60 is preferably an IBM-compatible system with a 386DX or 486DX processor, at least 2 MB of RAM, a hard disk, keyboard, display (e.g., VGA color monitor), and a number of expansion slots connected to the bus. A data I/O board (National Instruments Corp. #PC-DIO-96) is inserted into one expansion slot and a controller board is inserted into a second expansion slot to serve as a driver 61 to download images through the SLM interface board 65 to the reference SLM 16 and the filter SLM 26. The data I/O board is used to transfer data and commands from the processor to the controller board, and to generate system interrupts in the personal computer 60. The controller board stores up to 512 reference and filter images, downloads these images to the SLM's, modulates the laser 10, and triggers the camera 32.

The operating current for the laser diode 10 shown in FIG. 1 is controlled by a laser diode driver 64 (Melles Griot #06 DLD 201). The laser diode driver 64 is, in turn, controlled by the computer through the SLM driver boards 61 to activate the laser 10 when the correlator is in operation.

A video frame grabber board 62 is inserted into a third expansion slot in the PC. For example, a Cortex-I Video Frame Grabber board manufactured by Imagenation Corp. of Vancouver, Wash., can be used for this purpose. This card can capture and store up to four low-resolution (243×256 pixels) gray-scale images in its on-board RAM from the CCD camera 32.

The CCD camera 32 shown in FIG. 1 is interfaced to an external camera control unit 63 shown in FIG. 3.

The control unit 63 sets the shutter speed for the camera and allows the camera to be shuttered by an external asynchronous trigger generated by the frame grabber board 62 under the control of the personal computer system 60.

The personal computer includes software to control all aspects of the operation of the optical correlator. The software can download images to the SLM's, control system timing, track errors, and capture and store correlation images uploaded from the camera. The computer can be used to generate filter images by computing the phase conjugate of the Fourier transform for a desired target image. As many as 512 different reference and filter images for the SLM's can be downloaded through the data I/O board to memory residing on the SLM control board. The computer can also dynamically adjust the effective resolution of the SLM's by changing the resolution of the images that are downloaded. With a 256×256 SLM, the maximum possible resolution is 256×256 pixels. However, the computer can "bin" together adjacent pixels to effect various lower resolutions such as 128×128. Once the correlator is running, the stored images are downloaded in the SLM devices. At the appropriate time, the camera is triggered, the laser is enabled, and the correlation image is sent from the camera to the frame grabber board. This correlation image is then stored on the computer's hard disk. The software allows the user to control which SLM images are used, how long the laser is modulated, and when the camera is triggered.

The computer can also be used for preprocessing or filtering of reference images, and for subsequent processing of the correlation images retrieved by the frame grabber board. For example, the computer can be programmed to track motion of correlation peaks over time in the case of moving targets. The computer can also implement a filter image selection algorithm to intelligently select subsequent filter images to be downloaded to the filter SLM 26 based on the correlation results from previous filter images. This could be implemented by creating a tree structure of filter images through which the computer can progressively navigate to identify an unknown target.

The above disclosure sets forth a number of embodiments of the present invention. Other arrangements or embodiments, not precisely set forth, could be practiced under the teachings of the present invention and as set forth in the following claims.

We claim:

1. An optical correlator comprising:
   a laser for producing a beam of coherent polarized light;
   a reference spatial light modulator (SLM) for modulating and reflecting an incident beam of light, said reference SLM having:
   (a) means for storing a reference image in the form of a two-dimensional array of pixels; and
   (b) means for selectively modulating said incident beam by rotating the polarization of said beam for selected pixels corresponding to said reference image;
   a first polarizing beamsplitter for directing said laser beam onto said reference SLM and receiving said beam reflected from said reference SLM, said first beamsplitter being polarized to transmit modulated light reflected from said reference SLM and to block unmodulated light reflected from said reference SLM;
   Fourier transform lenses for receiving said modulated light beam transmitted by said first polarizing beamsplitter and producing a Fourier transform of said beam;
   a filter SLM for modulating and reflecting an incident beam of light, said filter SLM having:
   (a) means for storing a filter image in the form of a two-dimensional array of pixels, said filter image being the complex conjugate of the Fourier transform of a desired image; and
   (b) means for selectively modulating said incident beam by rotating the polarization of said beam for selected pixels corresponding to said filter image;
   a second polarizing beamsplitter for directing said Fourier transform beam onto said filter SLM and receiving said beam reflected from said filter SLM, said second polarizing beamsplitter being polarized to transmit modulated light reflected from said filter SLM and to block unmodulated light reflected from said filter SLM;
   inverse Fourier transform lenses for receiving said modulated light beam transmitted by said second polarizing beamsplitter and producing an inverse Fourier transform of said beam; and
   a camera for detecting any correlation peak produced by said inverse Fourier transform lenses.

2. The optical correlator of claim 1, wherein said reference SLM comprises an ferroelectric liquid crystal SLM.

3. The optical correlator of claim 1, wherein said SLM pixels are electrically addressable.

4. The optical correlator of claim 1, further comprising a polarizing filter between said inverse Fourier transform lenses and said camera.

5. The optical correlator of claim 1, further comprising a half-wave plate between said first polarizing beamsplitter and said reference SLM for adjustably aligning the polarization of light entering said reference SLM.

6. The optical correlator of claim 1, further comprising a half-wave plate between said second polarizing beamsplitter and said filter SLM for adjustably aligning the polarization of light entering said filter SLM.

7. The optical correlator of claim 1, further comprising a computer processor connected to said reference SLM and to said image SLM for downloading images to said SLM's.

8. The optical correlator of claim 1, wherein said Fourier transform lenses have two focal planes and said reference SLM and said filter SLM are at said focal planes of said Fourier transform lenses, and wherein said inverse Fourier transform lenses have two focal planes and said filter SLM and said camera are at said focal planes of said inverse transform lenses.

9. An optical correlator comprising:
   a laser for producing a beam of coherent polarized light;
   a reference spatial light modulator (SLM) for modulating and reflecting an incident beam of light, said reference SLM having:
   (a) means for storing a reference image in the form of a two-dimensional array of pixels;
   (b) a ferroelectric liquid crystal (FLC) layer for selectively modulating said incident beam by rotating the polarization of said beam for selected pixels corresponding to said reference image; and (c) a reflective backplane beneath said FLC layer for reflecting said incident beam;

a first polarizing beamsplitter for directing said laser beam onto said reference SLM and receiving said beam reflected from said reference SLM, said first beamsplitter being polarized to transmit modulated light reflected from said reference SLM and to block unmodulated light reflected from said reference SLM;

Fourier transform lenses for receiving said modulated light beam transmitted by said first polarizing beamsplitter and producing a Fourier transform of said beam;

a filter SLM for modulating and reflecting an incident beam of light, said filter SLM having:
  (a) means for storing a filter image in the form of a two-dimensional array of pixels, said filter image being the complex conjugate of the Fourier transform of a desired image;
  (b) a ferroelectric liquid crystal (FLC) layer for selectively modulating said incident beam by rotating the polarization of said beam for selected pixels corresponding to said filter image; and
  (c) a reflective backplane beneath said FLC layer for reflecting said incident beam;

a second polarizing beamsplitter for directing said Fourier transform beam onto said filter SLM and receiving said beam reflected from said filter SLM, said second polarizing beamsplitter being polarized to transmit modulated light reflected from said filter SLM and to block unmodulated light reflected from said filter SLM;

inverse Fourier transform lenses for receiving said modulated light beam transmitted by said second polarizing beamsplitter and producing an inverse Fourier transform of said beam;

a CCD camera for detecting any correlation peak produced by said inverse Fourier transform lenses; and a computer processor connected to said reference SLM and to said filter SLM for downloading images to said SLM's, and for analysis of correlation peaks detected by said CCD camera.

10. The optical correlator of claim 9 wherein said SLM pixels are electrically addressable by said computer processor.

11. The optical correlator of claim 9, further comprising a polarizing filter between said inverse Fourier transform lenses and said CCD camera.

12. The optical correlator of claim 9, further comprising a half-wave plate between said first polarized beamsplitter and said reference SLM for adjustably aligning the polarization of light entering said reference SLM.

13. The optical correlator of claim 9, further comprising a half-wave plate between said second polarized beamsplitter and said filter SLM for adjustably aligning the polarization of light entering said filter SLM.

14. The optical correlator of claim 9, wherein said Fourier transform lenses have two focal planes and said reference SLM and said filter SLM are at said focal planes of said Fourier transform lenses, and wherein said inverse Fourier transform lenses have two focal planes and said filter SLM and said camera are at said focal planes of said inverse transform lenses.

15. An optical correlator comprising:

a laser for producing a beam of coherent polarized light;

a reference spatial light modulator (SLM) for modulating and reflecting an incident beam of light, said reference SLM having:
  (a) an electrically addressable memory for storing a reference image in an array of pixels forming a reflective backplane; and
  (b) a ferroelectric liquid crystal layer (FLC) for selectively modulating said incident beam by rotating the polarization of said beam for selected pixels corresponding to said reference image;

a first polarizing beamsplitter for directing said laser beam onto said reference SLM and receiving said beam reflected from said reference SLM, said first beamsplitter being polarized to transmit modulated light reflected from said reference SLM and to block unmodulated light reflected from said reference SLM;

a first half-wave plate between said first polarized beamsplitter and said reference SLM for adjustably aligning the polarization of said incident beam entering said reference SLM;

Fourier transform lenses for receiving said modulated light beam transmitted by said first polarizing beamsplitter and producing a Fourier transform of said beam;

a filter SLM for modulating and reflecting an incident beam of light, said filter SLM having:
  (a) an electrically addressable memory for storing a filter image in a two-dimensional array of pixels forming a reflective backplane, said filter image being the complex conjugate of the Fourier transform of a desired image; and
  (b) a ferroelectric liquid crystal (FLC) layer for selectively modulating said incident beam by rotating the polarization of said beam for selected pixels corresponding to said filter image;

a second polarizing beamsplitter for directing said Fourier transform beam onto said filter SLM and receiving said beam reflected from said filter SLM, said second polarizing beamsplitter being polarized to transmit modulated light reflected from said filter SLM and to block unmodulated light reflected from said filter SLM;

a second half-wave plate between said second polarized beamsplitter and said filter SLM for adjustably aligning the polarization of said incident beam entering said filter SLM;

inverse Fourier transform lenses for receiving said modulated light beam transmitted by said second polarizing beamsplitter and producing an inverse Fourier transform of said beam;

a CCD camera for detecting any correlation peak produced by said inverse Fourier transform lenses; and a computer processor connected to said reference SLM and to said filter SLM for downloading images to said SLM's, and for analysis of correlation peaks detected by said CCD camera.

16. The optical correlator of claim 15, further comprising a polarizing filter between said inverse Fourier transform lenses and said CCD camera.

17. The optical correlator of claim 15, wherein said Fourier transform lenses have two focal planes and said reference SLM and said image SLM are at said focal planes of said Fourier transform lenses, and wherein said inverse Fourier transform lenses have two focal planes and said filter SLM and said CCD camera are at said focal planes of said inverse transform lenses.

* * * * *